United States Patent
Imai et al.

(10) Patent No.: US 7,554,586 B1
(45) Date of Patent: Jun. 30, 2009

(54) SYSTEM AND METHOD FOR SCENE IMAGE ACQUISITION AND SPECTRAL ESTIMATION USING A WIDE-BAND MULTI-CHANNEL IMAGE CAPTURE

(75) Inventors: Francisco Hideki Imai, Rochester, NY (US); Roy Stephen Berns, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 624 days.

(21) Appl. No.: 09/692,923

(22) Filed: Oct. 20, 2000

Related U.S. Application Data (60) Provisional application No. 60/160,565, filed on Oct. 20, 1999.

(51) Int. Cl.
*H04N 9/083* (2006.01)
(52) U.S. Cl. ........................ 348/269; 348/270
(58) Field of Classification Search .............. 348/188, 348/266, 268–270, 370, 371, 360, 361, 342
See application file for complete search history.

(56) References Cited

U.S. PATENT DOCUMENTS

| | | | |
|---|---|---|---|
| 3,684,824 A | 8/1972 | Koenig | |
| 3,714,875 A | 2/1973 | Yost, Jr. | |
| 3,720,146 A | 3/1973 | Yost, Jr. | |
| 3,758,707 A | 9/1973 | Keller et al. | |
| 3,785,812 A | 1/1974 | Matsumoto | |
| 3,796,826 A | 3/1974 | Kerr | |
| 3,806,633 A | 4/1974 | Coleman | |
| 3,922,714 A | 11/1975 | Delavie | |
| 3,975,748 A | 8/1976 | Green et al. | |
| 4,086,616 A | 4/1978 | Catano et al. | |
| 4,134,683 A | 1/1979 | Goetz et al. | |
| 4,215,273 A | 7/1980 | Stokes et al. | |
| 4,220,701 A | 9/1980 | Robillard | |
| 4,229,754 A | 10/1980 | French | |
| 4,282,527 A | 8/1981 | Winderman et al. | |
| 4,285,009 A | 8/1981 | Klopsch | |
| 4,328,515 A | 5/1982 | Wellendorf | |
| 4,393,399 A | 7/1983 | Gast et al. | |
| 4,402,611 A | 9/1983 | Yuasa | |
| 4,402,704 A | 9/1983 | Raisin et al. | |

(Continued)

OTHER PUBLICATIONS

Ohta, "Colorimetric Analysis in the Design of Color Films: A Perspective," *Journal of Imaging Science and Technology*, 36:63-72 (1992).

(Continued)

*Primary Examiner*—Timothy J Henn
(74) *Attorney, Agent, or Firm*—Nixon Peabody LLP (57) ABSTRACT

A system and method for multi-spectral image capture of a first scene includes acquiring a first series of images of the first scene with one or more image acquisition systems and filtering each of the first series of images of the scene with a different non-interference filter, illuminating each image of the first series of images with a different illuminant, or acquiring each of the images of the first series of images with a different image acquisition system. Each of the image acquisition systems has at least one color channel, each of the non-interference filters has a different spectral transmittance, and each of the illuminants has a different spectral power distribution.

24 Claims, 7 Drawing Sheets

U.S. PATENT DOCUMENTS

| | | | |
|---|---|---|---|
| 4,463,380 A | 7/1984 | Hooks, Jr. | |
| 4,464,677 A | 8/1984 | Kuhn et al. | |
| 4,476,487 A | 10/1984 | Klie et al. | |
| 4,577,219 A | 3/1986 | Klie et al. | |
| 4,596,930 A | 6/1986 | Steil et al. | |
| 4,599,001 A | 7/1986 | Richard | |
| 4,642,778 A | 2/1987 | Hieftje et al. | |
| 4,648,057 A | 3/1987 | Wagstaff et al. | |
| 4,709,144 A | 11/1987 | Vincent | |
| 4,758,075 A | 7/1988 | Hatano | |
| 4,794,398 A | 12/1988 | Raber et al. | |
| 4,806,750 A | 2/1989 | Vincent | |
| 4,866,454 A | 9/1989 | Droessler et al. | |
| 4,925,420 A | 5/1990 | Fourche et al. | |
| 4,982,150 A | 1/1991 | Silverstein et al. | |
| 5,067,158 A | 11/1991 | Arjmand | |
| 5,068,597 A | 11/1991 | Silverstein et al. | |
| 5,072,109 A | 12/1991 | Aguilera, Jr. et al. | |
| 5,093,763 A * | 3/1992 | Vanderschuit et al. | 362/18 |
| 5,109,276 A | 4/1992 | Nudelman et al. | |
| 5,132,802 A * | 7/1992 | Osthues et al. | 348/262 |
| 5,149,972 A | 9/1992 | Fay et al. | |
| 5,164,858 A | 11/1992 | Aguilera, Jr. et al. | |
| 5,200,838 A | 4/1993 | Nudelman et al. | |
| 5,248,977 A | 9/1993 | Lee et al. | |
| 5,265,172 A | 11/1993 | Markandey et al. | |
| 5,289,295 A | 2/1994 | Yumiba et al. | |
| 5,300,777 A | 4/1994 | Goodwin | |
| 5,300,778 A | 4/1994 | Norkus et al. | |
| 5,319,472 A | 6/1994 | Hill et al. | |
| 5,347,378 A * | 9/1994 | Handschy et al. | 349/78 |
| 5,371,542 A | 12/1994 | Pauli et al. | |
| 5,400,169 A | 3/1995 | Eden | |
| 5,420,704 A | 5/1995 | Winkelman | |
| 5,479,255 A | 12/1995 | Denny et al. | |
| 5,479,258 A | 12/1995 | Hinnrichs et al. | |
| 5,513,128 A | 4/1996 | Rao | |
| 5,535,314 A | 7/1996 | Alves et al. | |
| 5,539,517 A | 7/1996 | Cabib et al. | |
| 5,543,940 A | 8/1996 | Sherman | |
| 5,568,186 A | 10/1996 | Althouse | |
| 5,572,607 A | 11/1996 | Behrends | |
| 5,668,890 A | 9/1997 | Winkelman | |
| 5,680,150 A | 10/1997 | Shimizu et al. | |
| 5,724,135 A | 3/1998 | Bernhardt | |
| 5,729,465 A | 3/1998 | Barbaresco | |
| 5,731,621 A | 3/1998 | Kosai | |
| 5,748,236 A * | 5/1998 | Shibazaki | 348/270 |
| 5,760,899 A | 6/1998 | Eismann | |
| 5,781,336 A | 7/1998 | Coon et al. | |
| 5,838,938 A | 11/1998 | Morgan | |
| 5,850,418 A | 12/1998 | Van De Kerkhof | |
| 5,864,364 A * | 1/1999 | Ohyama et al. | 348/211.14 |
| 5,887,082 A | 3/1999 | Mitsunaga et al. | |
| 5,889,554 A | 3/1999 | Mutze | |
| 5,900,942 A | 5/1999 | Spiering | |
| 5,915,036 A | 6/1999 | Grunkin et al. | |
| 5,915,279 A | 6/1999 | Cantrall et al. | |
| 5,920,399 A | 7/1999 | Sandison et al. | |
| 5,923,049 A | 7/1999 | Böhm et al. | |
| 5,926,282 A | 7/1999 | Knobloch et al. | |
| 5,926,283 A | 7/1999 | Hopkins | |
| 5,929,985 A | 7/1999 | Sandison et al. | |
| 6,100,929 A * | 8/2000 | Ikeda et al. | 348/262 |
| 6,256,067 B1 * | 7/2001 | Yamada | 348/370 |
| 6,292,212 B1 * | 9/2001 | Zigadlo et al. | 348/33 |

OTHER PUBLICATIONS

Saunders et al., "Image Processing at the National Gallery: The VASARI Project," *National Gallery Technical Bulletin*, 14:72-85(1993).

Hunt, "Objectives in Colour Reproduction," *The Reproduction of Colour*, $5^{th}$ ed., England:Fountain Press, Chapter 11, pp. 222-242 (1995).

Burns, "Analysis of Image Noise in Multispectral Color Acquisition," Ph.D. Dissertation, Rochester Institute of Technology, pp. 1-178 (1997).

Overheads used in presentation of "Multi-Spectral-Based Color Reproduction Research" at the Munsell Color Science Laboratory, Rochester Institute of Technology, Rochester, New York (1998). Not Distributed.

Overheads used in presentation of "High-Resolution Multi-Spectral-Based Archives-A Hybrid Approach" at the Munsell Color Science Laboratory, Rochester Institute of Technology, Rochester, New York (1998). Not Distributed.

König et al., "The Practice of Multispectral Image Acquisition," *International Symposium on Electronic Capture and Publishing, Proc. SPIE*, 3409:34-41 (1998).

Berns et al., "Multi-spectral-based color reproduction research at the Munsell Color Science Laboratory," *Proceedings of SPIE*, 3409:14-25 (1998).

Imai et al., "High-Resolution Multi-Spectral Image Archives: A Hybrid Approach," *Final Program and Proceedings of IS &T/SID*, pp. 224-227 (1998).

Imai et al., "Spectral Estimation Using Trichromatic Digital Cameras," *International Symposium on Multispectral Imaging And Color Reproduction for Digital Archives*, pp. 42-49 (1999).

Imai et al., "A Comparative Analysis of Spectral Reflectance Reconstruction in Various Spaces Using a Trichromatic Camera System," *Final Program and Proceedings of IS&T and SID*, pp. 21-25 (1999).

Imai et al., "A Comparative Analysis of Spectral Reflectance Estimated in Various Spaces Using a Trichromatic Camera System," *Journal of Imaging Science and Technology*, 44:280-287 (2000).

* cited by examiner

SYSTEM AND METHOD FOR SCENE IMAGE ACQUISITION AND SPECTRAL ESTIMATION USING A WIDE-BAND MULTI-CHANNEL IMAGE CAPTURE

This application claims the benefit of U.S. Provisional Patent Application Ser. No. 60/160,565 filed on Oct. 20, 1999, which is herein incorporated by reference.

FIELD OF THE INVENTION

The invention relates generally to methods for capturing multi-spectral images and, more particularly, to a method and system for spectral image representation capture used for accurate spectral estimation using statistical analysis of the sampled spectral reflectances of objects in the scene.

BACKGROUND OF THE INVENTION

Traditional image capture involves the concatenation of two reproduction processes, photography and scanning. Unfortunately, traditional photography or the use of digital cameras using three channels is inherently device metameric and cannot reproduce the colors of the original object under different illuminants and for different observers. As a consequence, large color distortions can result during the image recording process. In other words, the colors of reproduced images may not accurately match the colors of the original scene or object. Furthermore, the variance in match equality due to device metamerism can be large, resulting in a dramatic reduction in color quality. Consequently, unless the color components in a reproduced image spectrally match those of the original image, metamerism will occur resulting in an observable difference between the original and the reproduced image under different light Metamerism is a situation in which spectrally different color stimuli look alike to a human because they have the same tristimulus values. Metamerism also defines apparent changes in color in a reproduction as compared to the original, as seen by an observer under different types of illumination, e.g., daylight vs. incandescent light, or by different observers under a single illumination. The reason for metamerism is that the observed color is a product of the color in the image and the color of the illumination, different color components in an image reflect the light differently. Device metamerism is a situation in which spectrally different color stimuli are represented with identical records by an image capture system.

Image editing is used to correct these observable differences between the original and the reproduced image. Unfortunately, editing not only consumes time and resources, but it is limited in how far it corrects the inherent limitations in color photography. Although the images can be pleasing, they are often unacceptable in terms of color accuracy. As a result, it is impossible to accurately capture original objects using the conventional techniques of photography and scanning.

To ensure that a color match occurs for all observers and under all lighting conditions a spectral match must be achieved. As a result, an image acquisition system should be able to provide signals that lead to a multi-spectral description of a scene. To obtain a multi-spectral description of a scene a variety of different multi-spectral imaging methods and systems have been disclosed, such as in: U.S. Pat. No. 3,684,824; U.S. Pat. No. 3,714,875; U.S. Pat. No. 3,720,146; U.S. Pat. No. 3,758,707; U.S. Pat. No. 4,134,683; U.S. Pat. No. 4,866,454; U.S. Pat. No. 5,109,276; U.S. Pat. No. 5,889,554; and U.S. Pat. No. 5,900,942 which are all herein incorporated by reference. Many of these systems rely upon multi-spectral image acquisition where light reaching a monochrome digital camera is attenuated by a set of narrow-band interference filters which are shifted in series in front of the camera lens.

Unfortunately, when using interference filters for image acquisition a major problem is caused by the transmittance characteristic of the filters which is dependent upon the angle of incidence. For example, in order to image a painting with horizontal dimensions of one meter from a distance of two meters between the painting and the filter, there is angle of incidence 14° for points in the extremities. Simulations have shown that this causes color differences of $2\Delta E^*_{ab}$ units in relation to the image obtained at 0° angle of incidence.

Another problem of using interference filters in image acquisition is that the surfaces of the interference filters are not exactly coplanar which results in spatial shifts and distortions within the captured image. Further, there may be inter-reflections caused by light bouncing between the interference filters and the camera lens. As a result, these technical problems have prevented the realization of practical multi-spectral imaging using interference filters without a considerable degree of expertise in multi-spectral imaging as well as complex image processing.

SUMMARY OF THE INVENTION

A method for multi-spectral image capture of a first scene in accordance with one embodiment of the present invention includes acquiring a first series of images of the first scene with one or more image acquisition systems and filtering each of the first series of images of the scene with a different non-interference filter from a set of non-interference filters. Each of the image acquisition systems has two or more color channels and each of the channels has a different spectral sensitivity. Each of the non-interference filters in the set of the non-interference filters has a different spectral transmittance.

An apparatus for multi-spectral image capture of a first scene in accordance with another embodiment of the present invention includes one or more image acquisition systems and a set of non-interference filters. Each of the image acquisition systems has two or more color channels with each of the channels having a different spectral sensitivity. Each of the image acquisition systems also acquires a first series of images of the first scene. Each of the non-interference filters has a different spectral transmittance, is positioned between the scene and the image acquisition system, and filters a different image in series of images.

A method for multi-spectral image capture of a first scene in accordance with another embodiment of the present invention includes providing two or more image acquisition systems which each have at least one spectrally unique color channel and acquiring a first series of images of the first scene. Each of the images of the first series of images is acquired with a different one of the image acquisition systems.

An apparatus for multi-spectral image capture of a first scene in accordance with another embodiment of the present invention includes two or more image acquisition systems. Each of the image acquisition systems has at least one spectrally unique color channel and each image of the first series of images is acquired with a different one of the image acquisition systems.

A method for multi-spectral image capture of a first scene in accordance with yet another embodiment of the present invention includes acquiring a first series of images of the first scene with one or more image acquisition systems and illuminating each image of the first series of images with a different illuminant from a set of two or more illuminants.

Each of the image acquisition systems has two or more color channels with each of the channels having a different spectral sensitivity. Each illuminant has a different spectral power distribution.

An apparatus for multi-spectral image capture of a first scene in accordance with yet another embodiment of the present invention includes an image acquisition system and a set of two or more illuminants. Each image acquisition system has two or more color channels with each of the color channels having a different spectral sensitivity. Each of the illuminants has a different spectral power distribution and illuminates one of the images of the first scene.

A method for estimating spectral reflectances in accordance with yet another embodiment of the present invention includes a few steps. Samples of known spectral reflectances which are representative of colorants of a first scene are obtained. A first multi-spectral description of the first scene from the samples is acquired. A transformation which maps channels of the first multi-spectral description of the first scene back to the known spectral reflectances is derived. A second multi-spectral description of a second scene is acquired. The transformation is applied to the second multi-spectral description of the second scene to generate spectral reflectances for the second scene.

A system for estimating spectral reflectances in accordance with yet another embodiment of the present invention includes samples, at least one image acquisition system, and a spectral image processing system. The samples have known spectral reflectances which are representative of colorants of a first scene. The image acquisition system obtains a first multi-spectral description of the first scene from the samples and a second multi-spectral description of a second scene. The spectral image processing system derives a transformation which maps channels of the first multi-spectral description of the first scene back to the known spectral reflectances and applies the transformation to the second multi-spectral description of the second scene to generate spectral reflectances of the second scene.

The present invention provides a number of advantages, including providing accurate spectral estimation that overcomes the problems of metamerism inherent to traditional trichromatic digital and chemical photography. With the present invention, an excellent color match can be achieved under all types of illumination for all observers.

Additionally, the present invention makes multi-spectral image acquisition faster than prior multi-spectral image acquisition. The present invention is faster because it captures multiple channels of the scene each time instead of the single channel capture in the narrow-band image acquisition.

Further, the present invention makes multi-spectral image acquisition less expensive than the prior multi-spectral image acquisition. When absorption filters are used in accordance with one embodiment of the present invention, the present invention requires fewer filters than prior methods with narrow-band interference filters and the absorption filters are generally less expensive than interference filters. When multi-illuminants are used in accordance with another embodiment of the present invention, the present invention can be inexpensively implemented because these illuminants are inexpensive and readily available.

Even further, the present invention provides a multi-spectral image capture system and method which is easy to implement. The present invention can be used by people without a high-degree of expertise in multi-spectral image acquisition by simply switching the filter in front of the camera in one embodiment or by changing the illumination for each image in another embodiment. As a result, the present invention could easily be used for a variety of different practical purposes, such as producing consumer catalogs with accurate color reproduction of goods being sold and archiving artwork in museums. Further, the present invention overcomes the inherent problems related to spectral reconstruction using narrow-band interference filters required in prior multi-spectral image acquisition systems and methods.

DETAILED DESCRIPTION

Figure 1A:
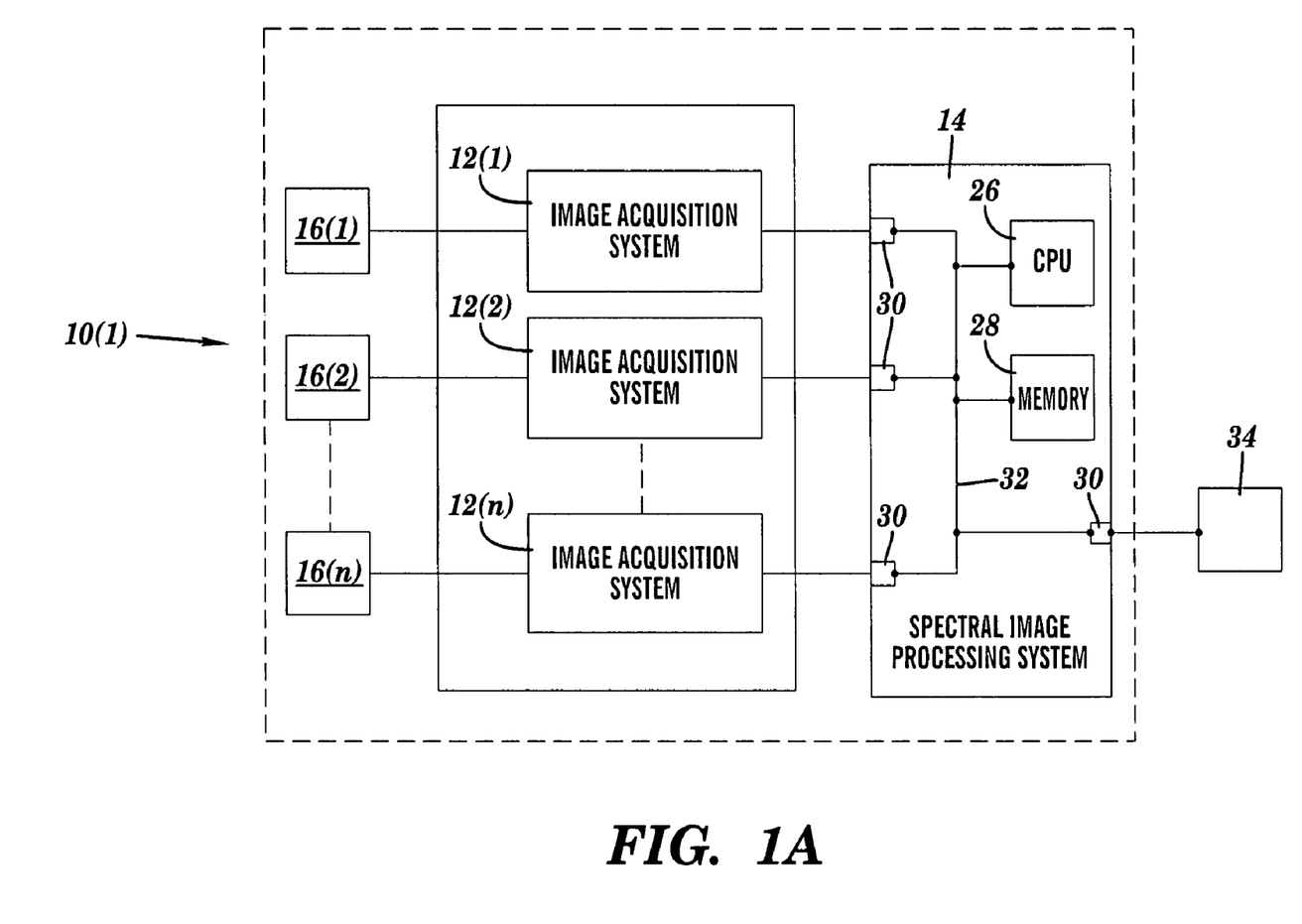
FIG. 1A is a block diagram of a multi-spectral acquisition and spectral reflectance estimation system in accordance with one embodiment of the present invention.
Figure 1B:
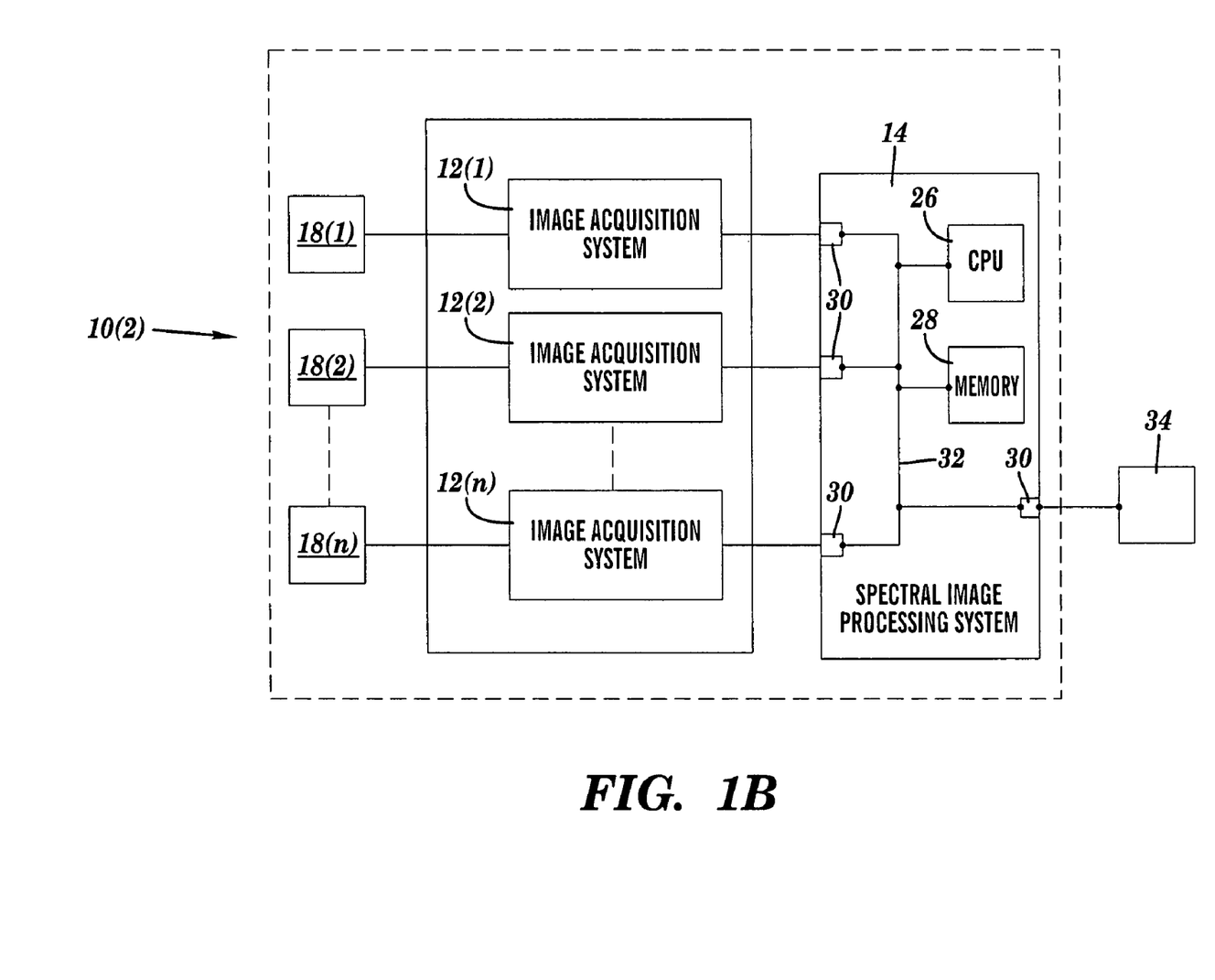
FIG. 1B is a block diagram of a multi-spectral acquisition and spectral reflectance estimation system in accordance with another embodiment of the present invention.

Multi-spectral acquisition and spectral reflectance estimation systems 10(1) and 10(2) in accordance with different embodiments of the present invention are illustrated in FIGS. 1A and 1B. The multi-spectral acquisition and spectral reflectance estimation systems 10(1) and 10(2) include at least one image acquisition system 12(1)-12($n$) and a spectral image processing system 14. The multi-spectral acquisition and spectral reflectance estimation systems 10(1) and 10(2) may also include at least one non-interference filter 16(1)-16($n$) and/or at least one illuminant 18(1)-18($n$). The present invention provides a number of advantages including providing a system and method which gives an accurate spectral reflectance estimation that overcomes the problems of metamerism and gives a system and method for multi-spectral image acquisition that is faster, less expensive, and easier to use than prior systems and methods.

Multi-spectral imaging is a recording of optical signals utilizing two or more wavelength regions of the visible or non-visible (infrared and ultraviolet) spectrum. A multi-spectral description of a scene 20 is a recording of optical signals associated with the scene 20 such that it is possible to reconstruct the spectral reflectance and/or radiance of the scene 20.

Referring more specifically to FIGS. 1A and 1B, in these particular embodiments the multi-spectral acquisition and spectral reflectance estimation systems 10(1) and 10(2) each include a plurality of image acquisitions systems 12(1)-12($n$), although the systems 10(1) and 10(2) each could have only one image acquisition system 12. An image acquisition or capture system 12 is any device that can record optical signals in electronic, physical or chemical form, such as a digital camera, a trichromatic digital camera, a photographic camera loaded with color negative film, a photographic camera loaded with color positive film, a color video camera, or a multi-spectral image capture system by way of example only.

Figure 2A:
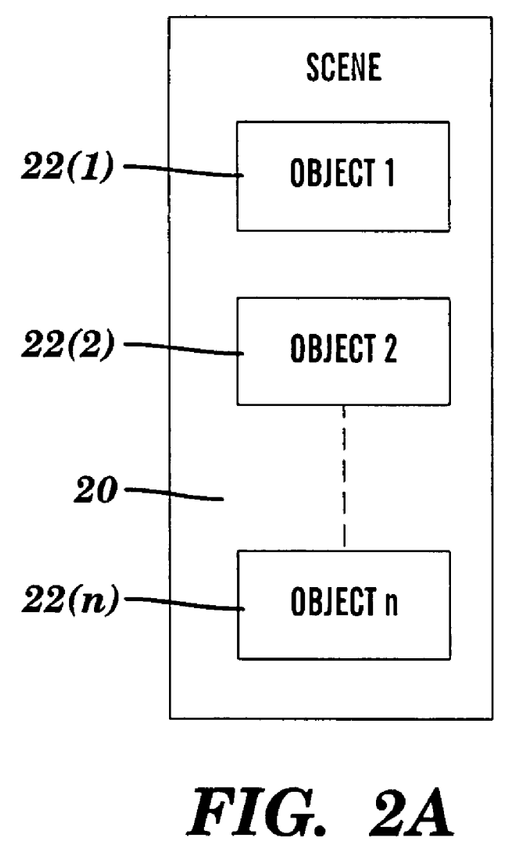
FIG. 2A is a diagram of a scene with objects.
Figure 2B:
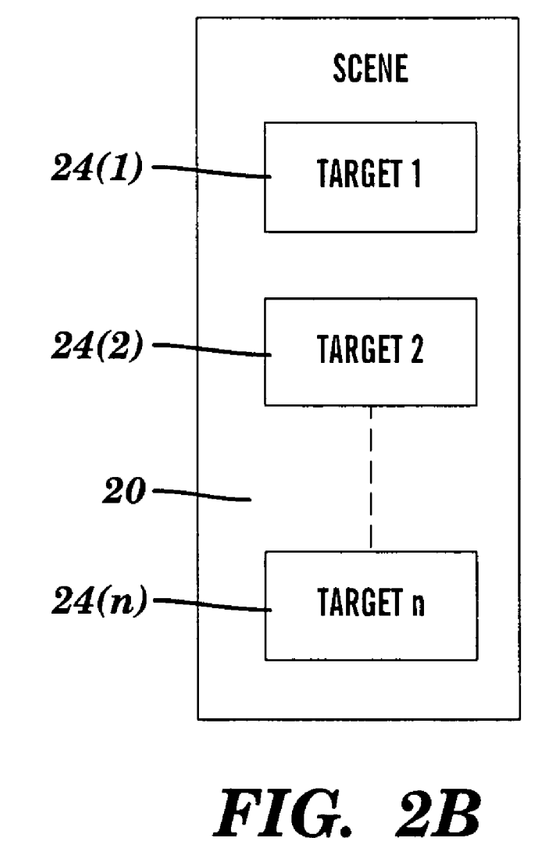
FIG. 2B is a diagram of a scene with targets.

Image acquisition systems 12(1)-12(n) capture images or image views 48(1)-48(n) of a scene 20 under given conditions, such as digital counts. The images or image views 48(1)-48(n) are representations of the scene 20. Objects 22(1)-22(n) or targets 24(1)-24(n) within the scene 20 can comprise a variety of different physical entities, such as human beings, other life forms, inanimate things and/or their backgrounds. Some examples of scenes with objects 22(1)-22(n) and targets 24(1)-24(n) are illustrated in FIGS. 2A and 2B.

The multi-spectral acquisition and spectral reflectance estimation systems 10(1)-10(2) also each include a spectral image processing system 14. The spectral image processing system 14 includes a processor or central processing unit ("CPU") 26, a memory 28, and one or more input/output (I/O) devices 30 which are all coupled together by a bus 32, although these systems can contain multiple processors, memories, I/O devices, and/or other components as needed or desired. Since the components and general operation of processing systems are well known to those of ordinary skill in the art, they will not be discussed here.

In these particular embodiments shown in FIGS. 1A and 1B, the memory 28 is programmed with the method for multi-spectral acquisition and spectral reflectance estimation in accordance with the present invention and which is described herein. The program or programs stored in memory 28 are executed by the CPU 26 to impart data retrieval, display, processing, analyzing and access functionality in the system 14. Typically, the memory 28 will also store other programs to be executed by the CPU 26. Any type of storage device that is coupled to the CPU 26, such as a RAM or ROM, or a disk or CD ROM drive which can receive, read data from, and/or write data to a portable memory device, such as a floppy disk, hard disk, or CD ROM, can be used as the memory 28.

The multi-spectral acquisition and spectral reflectance estimation system 10(1) shown in the embodiment in FIG. 1A also includes a set of non-interference color filters 16(1)-16(n). In this particular embodiment, each of the non-interference filters 16(1)-16(n) is located or positioned between the scene 20 and an aperture, opening, or other imaging surface for one of the image acquisition systems 12(1)-12(n). Each of the non-interference filters 16(1)-16(n) filter the images of the scene being captured or acquired. The non-interference filters 16(1)-16(n), may be connected to or spaced from each of the image acquisition systems 12(1)-12(n). Although a set of separate non-interference filters 16(1)-16(n) is shown, other types and numbers of non-interference filters can be used. For example, a single filter system, such as a single color filter wheel, could be used. In one particular embodiment, at least one of the non-interference color filters has a spectrally wide bandpass, typically in the range of 100 nm to 200 nm at half height. The spectrally wide bandpass for the non-interference color filter provides a better signal-noise ratio. A variety of different types of non-interference filters 16(1)-16(n), such as absorbance filters, writable filters and liquid crystal tunable filters, can be used. In particular, absorbance filters have been found to be useful because they are less expensive and easier to use than interference filters.

The multi-spectral acquisition and spectral reflectance estimation system 10(2) shown in the embodiment in FIG. 1B includes a set of illuminants 18(1)-18(n). In this particular embodiment, each of the illuminants 18(1)-18(n) is located or positioned to illuminate the scene being captured by one of the image acquisition systems 12(1)-12(n). The illuminants 18(1)-18(n), may be connected to or spaced from each of the image acquisition systems 12(1)-12(n). Although a set of separate illuminants 18(1)-18(n) is shown, other types and numbers of illuminants can be used. For example, a single illumination system which illuminates each of the images being captured differently, e.g. at different wavelengths, could also be used.

Although the multi-spectral acquisition and spectral reflectance estimation systems 10(1) and 10(2) shown in FIGS. 1A and 1B include either a set or plurality of non-interference color filters 16(1)-16(n) or a set of illuminants 18(1)-18(n), the system 10 may include both one or more non-interference filters 16(1)-16(n) and one or more or illuminants 18(1)-18(n) or neither a non-interference filter 16 or an illuminate 18. For example, a multi-spectral acquisition and spectral reflectance estimation system 10 in accordance with another embodiment includes two or more image acquisition systems 12 where each image acquisition system 12 has at least one spectrally unique color channel and each image of a series of images to be captured is acquired with a different one of the image acquisition systems 12, without one or more non-interference filters 16(1)-16(n) or one or more illuminants 18(1)-18(n).

The spectral image processing systems 10(1) and 10(2) may be coupled to a variety of different types of apparatuses or devices 34 to output the multi-spectral image or images, such as a cathode ray tube ("CRT") to display a reproduction of the scene 20, a printer for a catalog or other printing application, or a memory storage or archive device for archiving artworks. As a result, when these images are reproduced, the colors in the reproduced images will appear to be the same as the original images to all observers under all illuminations.

Figure 3:
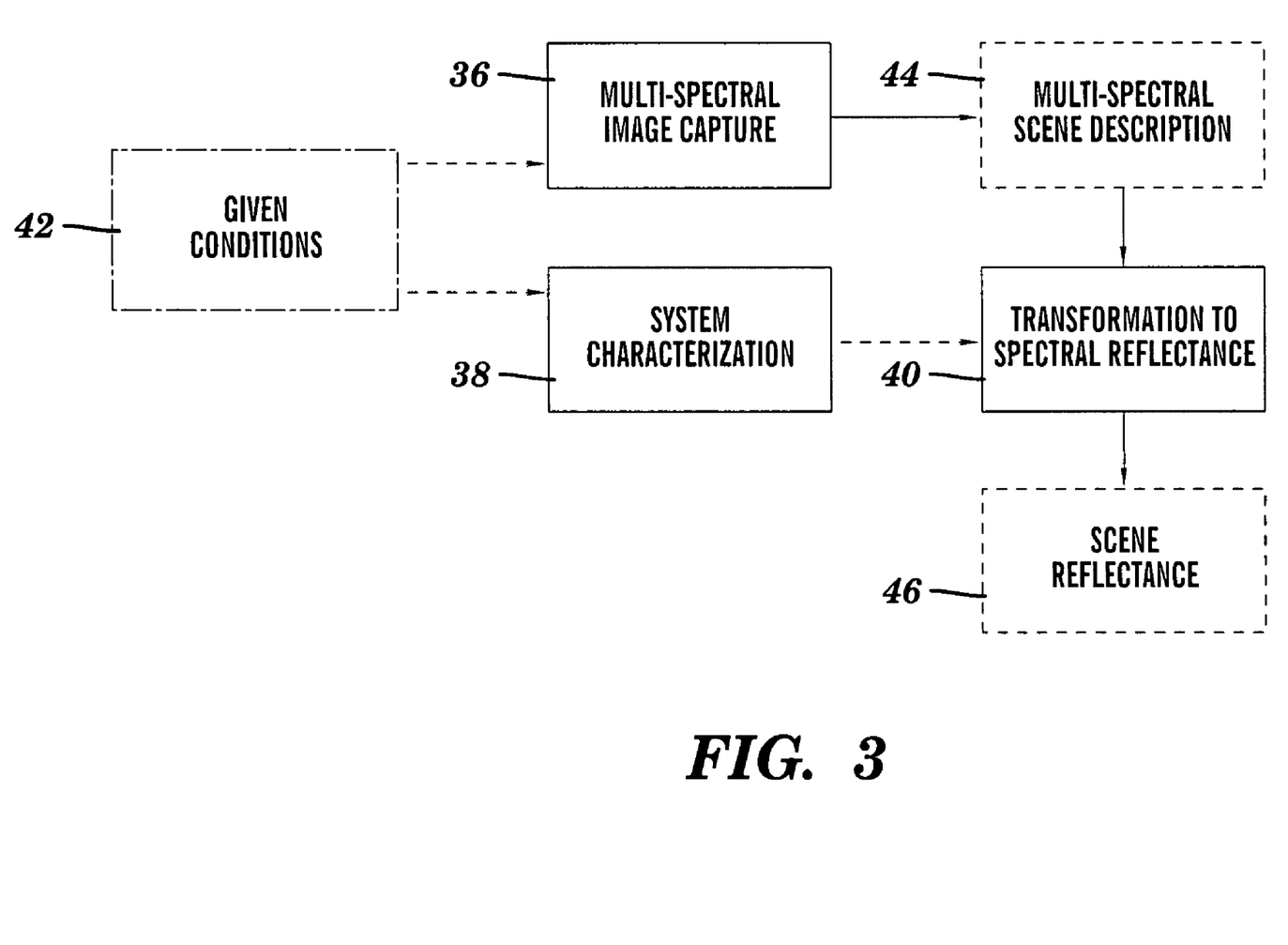
FIG. 3 is a flow chart of a multi-spectral acquisition and spectral reflectance estimation method in accordance with one embodiment of the present invention.

Referring to FIG. 3, the method in accordance with one embodiment of the present invention is illustrated. As discussed earlier, this method is stored as an executable program in the memory 28 and is executed by the spectral image processing system 14. The method includes a multi-spectral image capture module 36, a system characterization module 38, and a transformation-to-spectral reflectance module 40. Under given conditions 42, such as imaging geometry, illumination and filtering combinations, the multi-spectral image capture module 36 outputs a multi-spectral scene description 44. The system characterization module 38 under the given conditions 42 gives a mapping transformation that is used by the transformation-to-spectral reflectance module 40 in order to convert the multi-spectral scene description 44 to scene reflectance 46 which can then be stored or be used to reproduced the captured image or images by devices 34.

Figure 4:
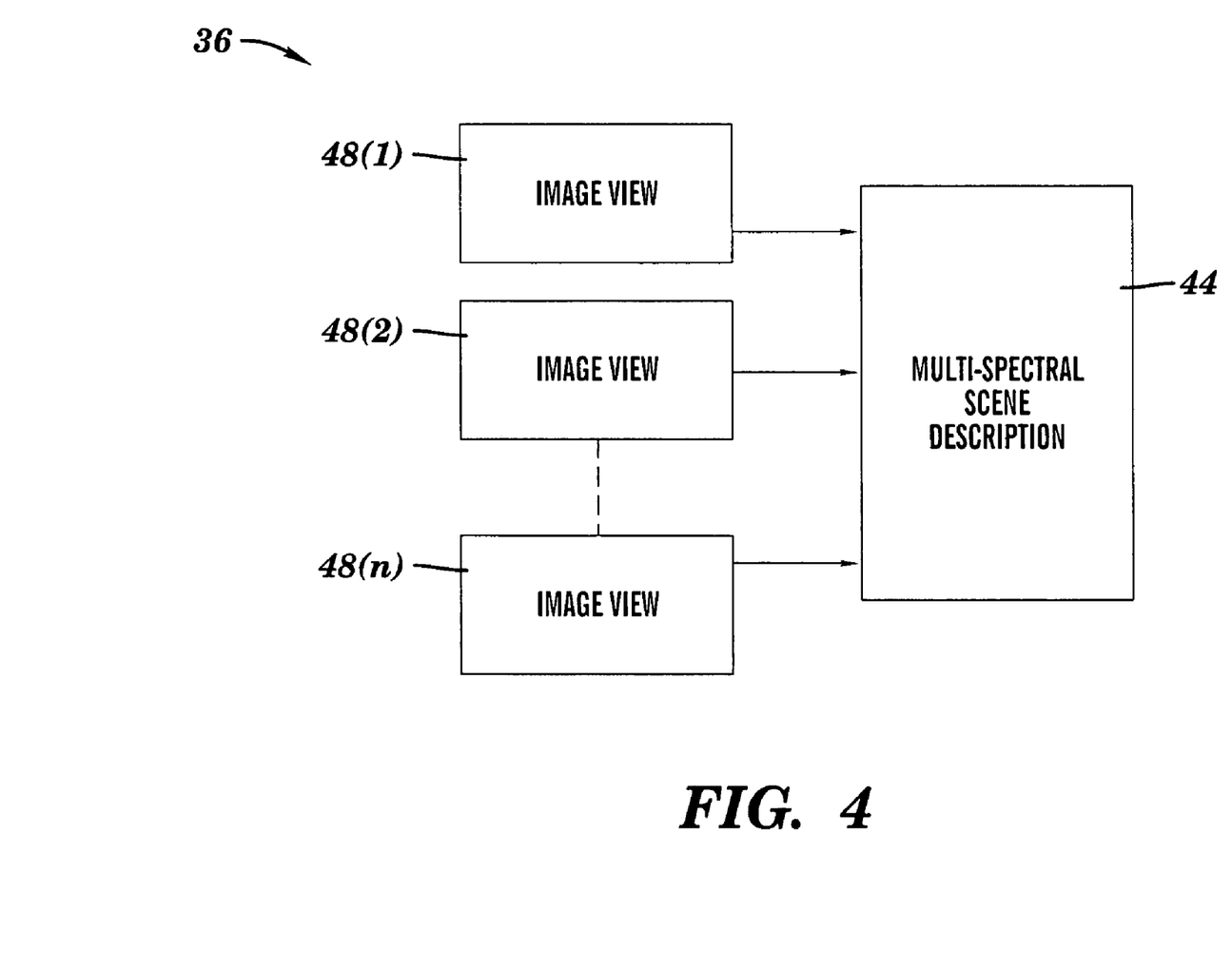
FIG. 4 is a flow chart of a multi-spectral image capture module for the system in accordance with one embodiment of the present invention.

Referring to FIG. 4, one embodiment of the multi-spectral image capture module 36 which is executed by the spectral imaging processing system 14 is shown. In this particular embodiment, each of the image acquisition systems 12(1)-12(n) capture an image or image view of the scene 20 with the objects 22(1)-22(n), such as the one shown in FIG. 2A, using either a different non-interference filter 16(1)-16(n) or a different illuminant 18(1)-18(n), although other image acquisition systems 12 and methods could be used. For example, a single image acquisition system 12 could be used to capture each image or image view 48(1)-48(n) with the multiple filters 16(1)-16(n) and/or illuminants 18(1)-18(n) shown or with a single filter system (not shown), such as a color wheel filter with multiple filters or a single illumination system (not shown) which can illuminate the image differently for each image capture. The multiple image views captured under a series of given conditions are combined to form a multi-spectral description 44 of the scene 20 or of object 22 or objects 22(1)-22(n) within the scene 20. Signals in the first multi-spectral description may be normalized and adjusted to keep a photometric linear relationship.

Figure 5:
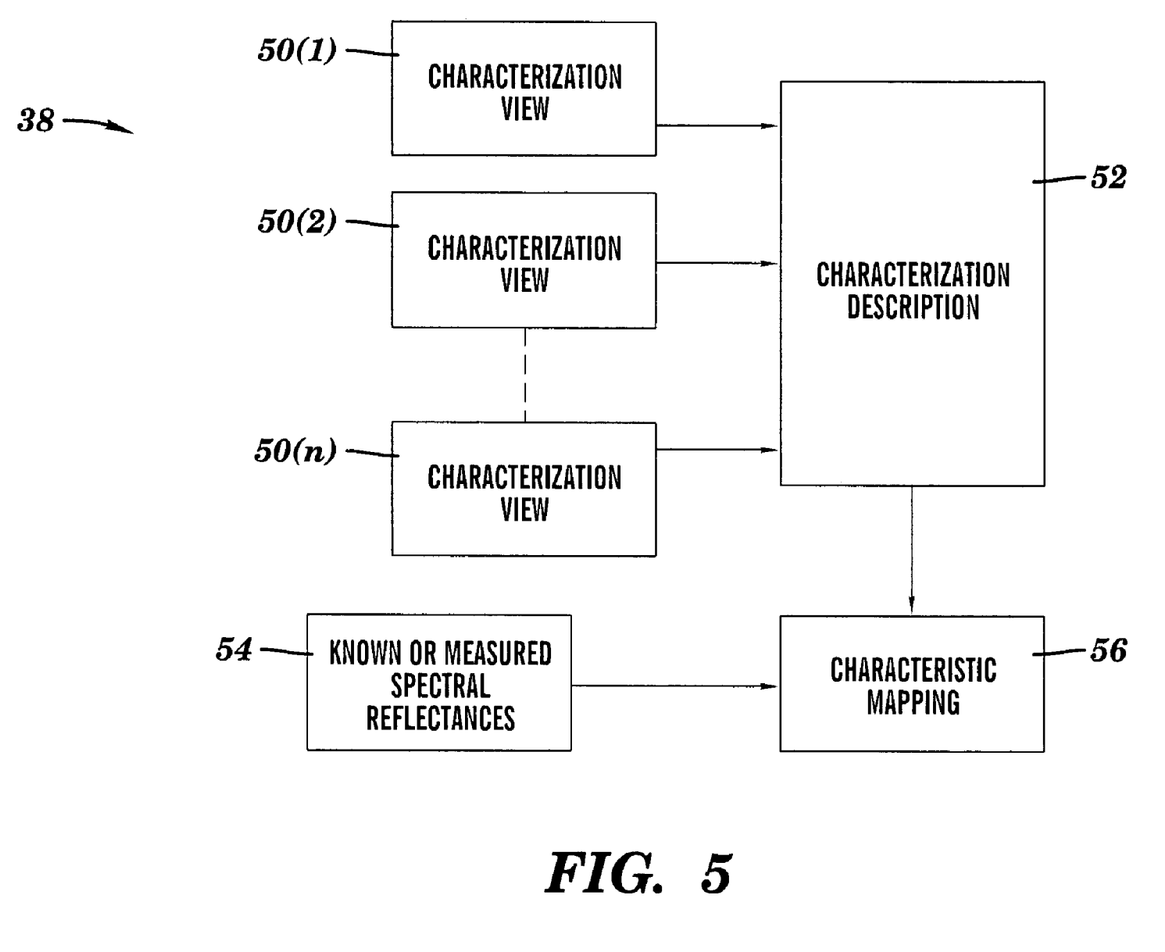
FIG. 5 is a flow chart of a system characterization module in accordance with one embodiment of the present invention.

Referring to FIG. 5, one embodiment of the system characterization module 38 which is executed by the spectral image processing system 14 is shown. In this particular embodiment, special targets 24(1)-24(n) with known spectral reflectances or with spectral reflectances which can later be measured are placed in a scene 20, as shown for example in FIG. 2B. These are known as characterization targets which are captured by the image acquisition systems 12(1)-12(n) under the given conditions 42 using either different non-interference filters 16(1)-16(n) or a different illuminants 18(1)-18(n) to create characterization views 50(1)-50(n), although again other image acquisition systems 10 and method could be used such as the one described with reference to FIG. 4. The multiple characterization views 50(1)-50(n) captured under a series of given conditions 42 are combined to form a characterization description 52. The characterization description 52 is analyzed by the spectral image processing system 14 along with the known or acquired spectral reflectance data 54 to create a mapping from the characterization description to spectral reflectance, known as a characteristic mapping 56.

Figure 6:
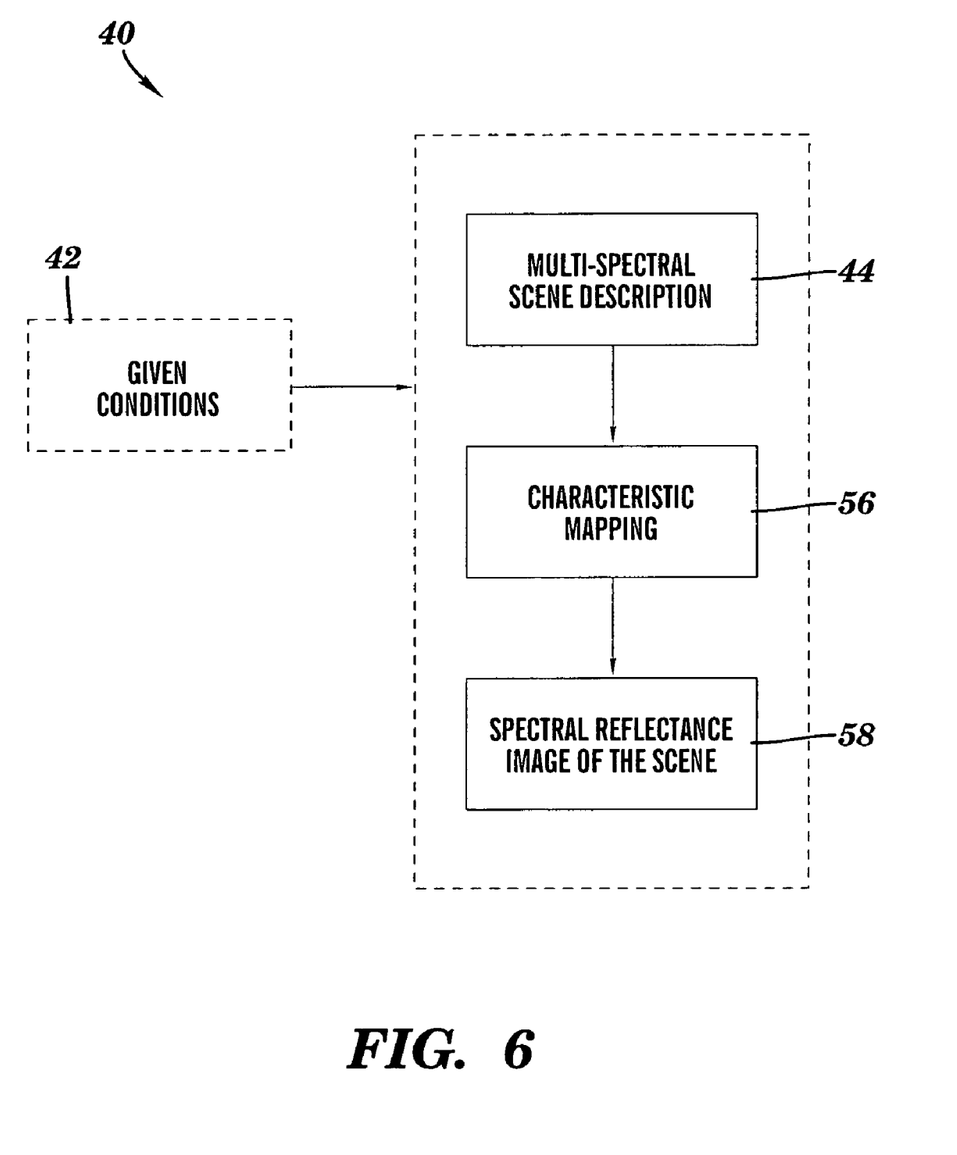
FIG. 6 is a flow chart of a system characterization module in accordance with one embodiment of the present invention.

Referring to FIG. 6, one embodiment of the transformation-to-spectral reflectance module 40 which is executed by the spectral image processing system 14 is shown. The characteristic mapping 56 derived under a series of image acquisition or given conditions 42 as described with reference to FIGS. 3 and 5 is applied to a multispectral description of a scene 20 which was captured under the same series of conditions 42 as described with reference to FIGS. 3 and 4. Based on these, a spectral reflectance image 58 of the scene 20 accurate for those objects 22(1)-22(n) within the scene 20, which includes the same colorants of which the characterization targets 24(1)-24(n) comprise, is derived. Accordingly, the present invention accurately reproduces for every pixel of the original image of the scene 20 with objects 22(1)-22(n) the spectral signature identical to that of the corresponding point in the original image of the scene 20. The spectral reflectance image 58 can be used in a variety of applications. For example, image 58 may simply be stored to archive an image, such as a work of art, or can be used for archiving images of artworks, for display on the device 34, such as CRT, or to accurately reproduce the image with a device 34.

The transformation may be performed in a variety of different spaces, such as spectral reflectance space, absorption space, and a new optimized space. If the transformation is performed in new optimized space, the new optimized space may be optimized to derive multi-variate normality of samples or improve spectral estimation accuracy.

Set forth below is a more detail explanation of one example of the process used to obtain the spectral reflectance of an image 58 of a scene 20. In this particular embodiment, the spectral reflectance of each pixel of the images taken from a scene 20 composed of objects 22(1)-22(n), such as the one shown in FIG. 2B, can be estimated using a priori spectral analysis with direct measurement and imaging of the characterization targets 24(1)-24(n) to establish a relationship between the digital counts and spectral reflectance. In order to relate the digital counts to spectral reflectance, a linear method is used. The spectral radiance, S, of the illuminant in the scene 20, as well as the spectral sensitivities, D, of the image acquisition system 12, the transmittances, F, of the filters 16 and the spectral reflectance, r, of the objects 22(1)-22(n) are measured and the resulting digital counts of the image view, Dc, are extracted from the imaged patches.

The multi-spectral image acquisition can be modeled using matrix-vector notation. Expressing the sampled illumination spectral power distribution as $$s = \begin{pmatrix} s_1 & & & 0 \\ & s_2 & & \\ & & \ddots & \\ 0 & & & s_n \end{pmatrix},$$

and the object spectral reflectance as $r=(r_1, r_2, \ldots r_n)^T$, where the index indicates the set of n wavelengths over the visible range and T the transpose matrix, representing the transmittance characteristics of the m filters as columns of F $$F = \begin{pmatrix} f_{1,1} & f_{1,2} & \cdots & f_{1,m} \\ \vdots & \vdots & \cdots & \vdots \\ f_{n,1} & f_{n,2} & \cdots & f_{n,m} \end{pmatrix}$$

and the spectral sensitivity of the detector as $$D = \begin{pmatrix} d_1 & & & 0 \\ & d_2 & & \\ & & \ddots & \\ 0 & & & d_n \end{pmatrix},$$

then the captured image is given by $D_c=(DF)^T Sr$, where $D_c$ represents the digital counts.

In this particular example, the spectral reflectance is sampled in the range of 400 nm to 700 nm wavelength in 10 nm intervals resulting in thirty-one samples, although different ranges and different intervals for examples can be used. Accordingly, in this particular example there are thirty-one signals to reconstruct the spectral reflectance of the image 58. However, it is possible to decrease the dimensionality of the problem by performing principal component analysis on the spectral samples. Given a sample population of spectral reflectances, it is possible to identify a small set of underlying basis functions whose linear combinations can be used to approximate and reconstruct members of the populations. Then the reconstructed sample $r_i$ is given by $$\hat{r} = \Phi \alpha_i \qquad (4)$$

where $\Phi=(e_1 \ e_2 \ \ldots \ e_p)$ are the set of the eigenvectors (principal components) used for the estimation and the coefficients (eigenvalues) associated with the eigenvectors are $\alpha_i=(a_1 \ a_2 \ \ldots \ a_p)^T$ where the index $p \leq n$, and where n is the number of samples used to perform a priori principal component analysis. When the eigenvalues are arranged in descending order the fraction of variance explained by the first corresponding p vectors is $$v_p = \frac{\sum_{i=1}^{p} a_i}{\sum_{i=1}^{n} a_i} \qquad (5)$$

In this linear method, a set of spectral reflectances r is measured and then a set $\phi$ of eigenvectors, which typically explain more than 99.9% of the original sample, is calculated by principal component analysis. Next, the set of eigenvalues, α, is calculated by $\alpha=\phi^T r$. The set of digital counts corresponding to the spectral samples can be calculated by the equation $$D_c=(DF)^T Sr.  \quad (6)$$

and a relationship between digital counts and eigenvalues can be established by the equation $$A=\alpha D_c^T [D_c D_c^T]^{-1}  \quad (7)$$

A set of spectral reflectances, r, of characterization targets 18(1)-18(n) are measured and then the corresponding set of eigenvectors, e, is calculated by principal component analysis. The set of eigenvalues, α, corresponding to the eigenvectors, e, is calculated using the spectral reflectances, r. The same set of patches are imaged as scenes 20 and the multispectral description is given of the captured image views 48(1)-48(n) are given by the digital counts. The eigenvectors corresponding to the spectral reflectances are used to derive the characterization mapping 56 given by the transformation matrix A. When the image is captured, using for example an R,G,B trichromatic camera and either a set of non-interference filters 16(1)-16(n) or under different illuminants 18(1)-18(n) as shown in FIGS. 1A and 1B although other systems 10 could be used, the spectral reflectance 58 of each pixel of the image can be calculated using matrix A and equation 4.

Accordingly, in one embodiment a direct matrix transformation from digital counts to the spectral reflectances is derived. An eigenvector analysis is also used to derive the transformation. Further, a Wiener estimate transformation from digital counts to the spectral reflectances which accounts for noise information may also be derived and used.

Thus, the present invention provides a number of advantages by allowing:

1. The possibility of accurate spectral reflectance estimations by overcoming the problems of device metamerism resulting from traditional image digitization using photography and scanning;

2. Overcoming the inherent problems related to spectral reconstruction using narrow-band interference filters;

3. The implementation of a multi-spectral image acquisition system that is faster, less expensive, and easier to use than prior methods and systems.

EXAMPLES

By way of example only, some embodiments of the present invention were implemented and tested for various targets and are described below. In these examples, two different image acquisition systems 10 and three targets 18 were tested. More specifically, the image acquisition systems 10, non-interference filters 16, and illuminants 18 used were a high-resolution trichromatic IBM PRO\3000 digital camera system (3,072×4,096 pixels, R, G, B filter wheel, 12 bits per channel that has a 45°/0° imaging configuration using tungsten illumination) and a Kodak DCS560 digital camera (3,040×2,008 pixels, built-in R, G, B array sensors, 12 bits per channel). Both IBM PRO\3000 and Kodak DCS560 digital camera systems provide linear TIFF data files. The spectral sensitivities of the IBM PRO\3000 digital camera system were measured, as well as the spectral radiant power of the illuminant used in this imaging system. A Gretag,Macbeth ColorChecker and two paintings as well as their corresponding painted patches were imaged. One of the paintings and its corresponding painting patches were generated using a mixture of GALERIA acrylic paints produced by Winsor & Newton. The acrylic painted patches were made with mixtures of two and three colorants generating 218 patches. The other paint and the corresponding painted patches were generated using post-color paints. The post-color painted patches were made with mixtures of two colorants generating 105 patches. The paint produced using post-color paints, as well as its corresponding patches were coated with Krylon Kamar Varnish that is a non-yellowing protection.

Different combinations of trichromatic signals were obtained from either multi-illuminant or multi-filter approaches. In the multi-filter approach, for both examples, trichromatic signals without filtering, the trichromatic signals with a light-blue filter (Kodak Wratten filter number 38), and the trichromatic signals with very-light-green filter (Kodak Wratten filter number 66) positioned in front of an aperture to the camera lens of the image acquisition systems 12 were combined. For the multi-illuminant approach, the portability of Kodak DCS560 digital camera, was used to combine different trichromatic signals obtained from targets imaged in the GretagMacbeth SpectraLight II Booth under Illuminants A and filtered tungsten, simulating D65.

In summary, in order to verify the performance of these particular examples of the present invention, two different trichromatic camera systems, one with R, G, B filter wheel and the other with a built-in R, G, B array, were used to image three different targets comprising the GretagMacbeth ColorChecker and two sets of painted patches (one made using acrylic paints and the other made using post-color paints). The multi-illuminant and multi-filter approaches were also compared for one of the camera systems. The performance for each approach, target and camera system was evaluated in terms of calorimetric accuracy, spectral reflectance factor rms error and metameric index that gives an indication of spectral match in terms of calorimetric metric comparing a standard illumination condition to another designated illuminant.

The results of these experiments for these particular examples showed:

1. The performance of principal component analysis depends on the particular samples and that the use of six eigenvectors to reconstruct spectra is a compromise between accuracy and cost;

2. Different combinations of various absorption filters do not affect the performance of the spectral reconstruction according to the spectral estimation using simulated digital counts from the IBM PRO\3000 digital camera system;

3. The spectral reconstruction using a trichromatic camera with multi-filter approach from measured digital counts produced similar results in two different digital camera systems;

4. The spectral estimation using trichromatic signals with multi-filter and multi-illuminant approaches presented similar performance; and 5. The estimation of spectral reflectance using trichromatic digital camera and either multi-filtering or multi-illumination presented calorimetric accuracy similar to the traditional approaches using monochrome camera and interference narrow-band filters (e.g. the experiments performed with a Kodak DCS200 camera and seven interference filters, and the MARC camera in the VASARI project).

Accordingly, the present invention overcomes some inherent problems of imaging using a traditional monochrome camera combined with interference filters and reduces the cost and complexity of the image acquisition system while preserving its calorimetric and spectral accuracy. Additionally, the present invention makes the image acquisition easier than the traditional monochrome camera and interference-filter-based multi-spectral acquisition. Further, in one embodiment of the present invention having the conventional trichromatic signal recorded in the trichromatic-based multimedia imaging devices also makes it easier to display the image on a CRT through appropriate color management. Even further, the spectral images generated by the present invention are also fundamental to the multi-ink printing system that can select a subset of inks that achieve a spectral match between original objects and their printed reproductions.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto

What is claimed is:

1. A method for multi-spectral image capture of a first scene, the method comprising:
    acquiring a first series of images of the first scene with one or more image acquisition systems, each of the image acquisition systems having an imaging sensor which has a set of color filters thereon and has two or more color channels, each of the channels having a different spectral sensitivity;
    filtering each of the first series of images of the scene with a different filter from a set of non-interference, color filters, each of the non-interference filters in the set of the non-interference filters having a different spectral transmittance and is positioned between the scene and the one or more image acquisition systems;
    acquiring a second series of images of a second scene with the one or more image acquisition systems; and
    filtering each of the second series of images of the second scene with a different filter from the set of filters;
    generating a characteristic mapping from two or more color channel signals from the second series of filtered images; and
    generating a multi-spectral scene description from two or more of the acquired first series of filtered images.

2. The method as set forth in claim 1 further comprising generating a spectral reflectance of the first scene from the multi-spectral scene description and the characteristic mapping.

3. The method as set forth in claim 2 further comprising using the generated spectral reflectance to reproduce the first scene.

4. The method as set forth in claim 2 further comprising storing the generated spectral reflectance for the first scene.

5. The method as set forth in claim 1 further comprising illuminating each image of the first series of images with one or more illuminants.

6. The method as set forth in claim 1 further comprising illuminating each image of the first series of images with an illuminant from a set of two or more illuminants as each of the first series of images is being acquired, each of the illuminants having a different spectral power distribution.

7. The method as set forth in claim 1 wherein the set of non-interference filters comprise at least one of an absorbance filter, a writable filter, and a liquid crystal tunable filter.

8. The method as set forth in claim 7 wherein the non-interference filters are the absorption filters.

9. An apparatus for multi-spectral image capture of a first scene, the apparatus comprising:
    one or more image acquisition systems each having an imaging sensor which has a set of color filters thereon and has two or more color channels, each of the channels having a different spectral sensitivity, each of the image acquisition devices acquiring a first series of images of the first scene;
    a set of non-interference, color filters, each of the non-interference, filters in the set of the non-interference filters has a different spectral transmittance, is positioned between the scene and the image acquisition system, and filters a different image in the first series of images; and
    a spectral image processing system which generates a multi-spectral scene description from two or more of the acquired first series of filtered images, the image acquisition systems acquires a second series of images of a second scene, the set of filters filter each of the second series of images of the second scene with a different filter, the spectral image processing system generates a characteristic mapping from two or more color channel signals from the second series of filtered images.

10. The apparatus as set forth in claim 9 wherein the spectral image processing system generates a spectral reflectance of the first scene from the multi-spectral scene description and the characteristic mapping.

11. The apparatus as set forth in claim 10 further comprising a printing device to reproduce the first scene based on the generated spectral reflectance.

12. The apparatus as set forth in claim 10 further comprising a memory device for storing the generated spectral reflectance for the first scene.

13. The apparatus as set forth in claim 9 further comprising one or more illuminants which illuminate each image of the first series of images.

14. The apparatus as set forth in claim 9 further comprising a set of two or more illuminants, each of the illuminants having a different spectral power distribution and illuminating one of the images of the first series of images.

15. The apparatus as set forth in claim 9 wherein the set of non-interference filters comprise at least one of an absorbance filter, a writable filter, and a liquid crystal tunable filter.

16. The apparatus as set forth in claim 15 wherein the non-interference filters are the absorption filters.

17. A method for multi-spectral image capture of a first scene, the method comprising:
    acquiring a first series of images of the first scene with one or more image acquisition systems, each of the image acquisition systems having an imaging sensor which has a set of color filters thereon and has two or more color channels, each of the channels having a different spectral sensitivity;
    illuminating each image of the first series of images with a different illuminant from a set of two or more illuminants, each illuminant having a different spectral power distribution;
    generating a multi-spectral scene description from the acquired first series of filtered images;
    acquiring a second series of images of a second scene with the one or more image acquisition systems;
    illuminating each of the second series of images of the second scene differently; and
    generating a characteristic mapping from the second series of filtered images.

18. The method as set forth in claim 17 further comprising generating a spectral reflectance of the first scene from the multi-spectral scene description and the characteristic mapping.

19. The method as set forth in claim 18 further comprising using the generated spectral reflectance to reproduce the first scene.

20. The method as set forth in claim 19 further comprising storing the generated spectral reflectance for the first scene.

21. An apparatus for multi-spectral image capture of a first scene, the apparatus comprising:
- an image acquisition system having an imaging sensor which has a set of color filters thereon and has two or more color channels, each of the color channels having a different spectral sensitivity;
- a set of two or more illuminants, each illuminant having a different spectral power distribution and illuminating one of the images of the first scene; and
- a spectral image processing system which generates a multi-spectral scene description from the acquired first series of filtered images;
- wherein the image acquisition systems acquire a second series of images of a second scene and the set of color illuminants illuminate each of the second series of images of the second scene with different spectral power distribution;
- wherein the spectral image processing system generates a characteristic mapping from the second series of illuminated images.

22. The apparatus as set forth in claim 21 wherein the spectral image processing system generates a spectral reflectance of the first scene from the multi-spectral scene description and the characteristic mapping.

23. The apparatus as set forth in claim 22 further comprising a printing device to reproduce the first scene based on the generated spectral reflectance.

24. The apparatus as set forth in claim 22 further comprising a memory device for storing the generated spectral reflectance for the first scene.

* * * * *